United States Patent [19]
Broome et al.

[11] Patent Number: 5,940,217
[45] Date of Patent: Aug. 17, 1999

[54] ANTI-ALIASING DIFFRACTIVE APERTURE AND OPTICAL SYSTEM USING THE SAME

[75] Inventors: Barry G. Broome, Carlsbad, Calif.; Curtis A. Corum, Chandler, Ariz.

[73] Assignee: Intel Corporation, Santa Clara, Calif.

[21] Appl. No.: 09/073,771

[22] Filed: May 6, 1998

[51] Int. Cl.[6] .................................................. G02B 27/10
[52] U.S. Cl. .................... 359/618; 359/724; 359/737; 359/738; 359/894; 355/67; 362/268; 430/396
[58] Field of Search ...................... 359/618, 737, 359/738, 893, 894, 565, 558, 559, 724; 355/53, 67; 362/268

[56] References Cited

U.S. PATENT DOCUMENTS

| | | | |
|---|---|---|---|
| 4,746,205 | 5/1988 | Cross et al. ............................ | 359/618 |
| 5,607,821 | 3/1997 | Haruki et al. .......................... | 430/396 |
| 5,636,003 | 6/1997 | Tanitsu et al. ......................... | 355/67 |
| 5,642,456 | 6/1997 | Baker et al. ........................... | 359/894 |
| 5,706,139 | 1/1998 | Kelly ..................................... | 359/737 |
| 5,734,504 | 3/1998 | Billman ................................. | 359/618 |
| 5,857,319 | 2/1999 | Sugiyama et al. .................... | 359/618 |

*Primary Examiner*—Loha Ben
*Attorney, Agent, or Firm*—Blakely, Sokoloff, Taylor & Zafman

[57] ABSTRACT

In one embodiment, an anti-aliasing apparatus is disclosed. The anti-aliasing apparatus includes an aperture stop including an array of apertures. Each of the apertures on the aperture stop diffracts light passing therethrough and provides spreading of an image of a point object in a controlled image irradiance distribution. In another embodiment, an optical system is disclosed. The optical system includes a detector array having an array of pixels and an aperture stop positioned between an object plane and the detector array. The aperture stop includes an array of apertures, each of which diffracts light passing therethrough and provides a controlled spreading of the light to cover more than one pixel of the detector array.

24 Claims, 9 Drawing Sheets

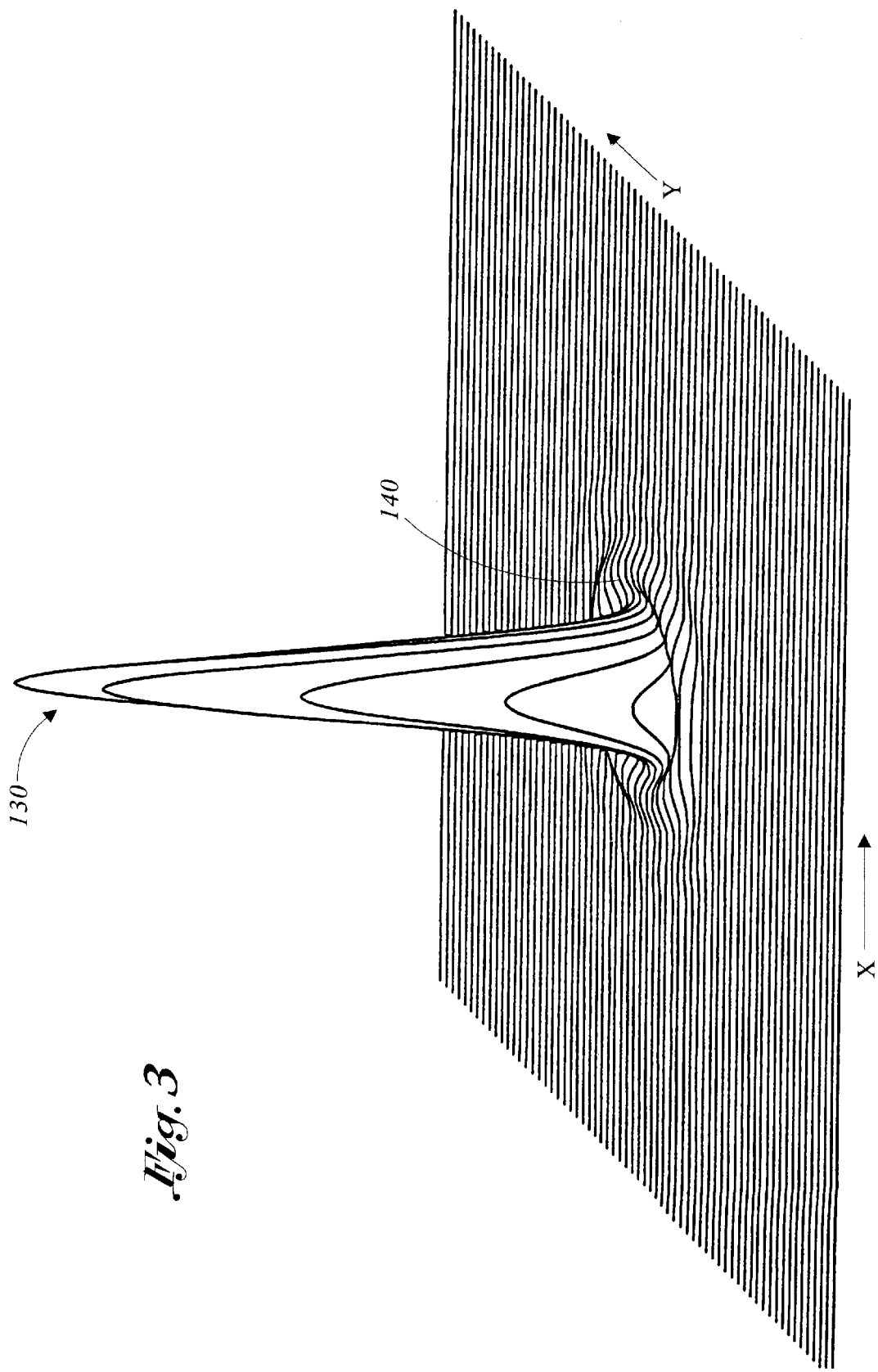

ANTI-ALIASING DIFFRACTIVE APERTURE AND OPTICAL SYSTEM USING THE SAME

BACKGROUND OF THE INVENTION

1. Field of the Invention

The present invention relates generally to the field of optical systems, and specifically, to an anti-aliasing diffractive aperture for reducing aliasing effects.

2. Background Information

Optical systems that discretely sample images on detector arrays produce aliasing effects in the displayed image. Aliasing occurs in detector arrays when the spatial frequencies in the image are higher than the detector array's Nyquist frequency (i.e., half the sensor sampling frequency). Color Filter Arrays ("CFAs") integrated into discretely sampled detector arrays introduce color-aliasing effects. An example of aliasing effects in a monochrome (black and white) TV image are Moiré effects that cause an image having a periodic structure to move and change patterns when the image moves relative to a charge coupled device ("CCD") detector array and has dimensions commensurate with the pixel dimensions of the detector array. An example of color aliasing effects in a CFA CCD detector system is the similar Moire effects that cause an image having a periodic structure to move, change patterns, and change color when the image moves relative to the detector array and has dimensions commensurate with the pixel dimensions of the detector. For example, when a building, having very narrow columns, is carefully observed on a TV using a CFA detector system in a camera, some columns will have a red tint, some a green tint, and some a blue tint. As the camera moves, the tinted pattern shifts from one column to another.

One solution for eliminating or minimizing aliasing effects involves the addition of a quartz plate in front of the detector array. The quartz plate blurs and reduces the sharpness of the image just the right amount to minimize such aliasing effects. However, quartz plates are very expensive, virtually costing as much as a lens system. Another solution involves the use of molded structures near the aperture stop of a lens system. These structures typically use a single, very weak (i.e., having a height of a few wavelengths of light), four-sided pyramid to form four displaced images at the detector array surface. Because each of these four images are formed by a section of the aperture that looks like one-quarter of a pie, the image structure is a function of the size of the aperture stop, the object distance, and the zoom position. In essence, this pyramidal feature divides the incident wavefront from a point object into four pie-shaped wavefronts that converge to four blurred images at the detector. However, this type of anti-aliasing feature is undesirable because the amount of anti-aliasing required changes as the size of the aperture stop, the object distance, and the zoom position changes.

Accordingly, there is a need in the art for a method and apparatus for minimizing aliasing and color aliasing commonly associated with digital cameras that discretely sample an image produced by an optical system.

SUMMARY OF THE INVENTION

The present invention is an anti-aliasing apparatus. In one embodiment, the anti-aliasing apparatus includes an aperture stop including an array of apertures. Each of the apertures on the aperture stop diffracts light passing therethrough and provides spreading of an image of a point object in a controlled irradiance distribution.

BRIEF DESCRIPTION OF THE DRAWINGS

The features and advantages of the present invention will become apparent from the following detailed description of the present invention in which:

FIG. 3 illustrates the intensity distribution of a point image PSF for the f/8.0 aperture stop of FIG. 2.

DETAILED DESCRIPTION

In one embodiment, the present invention is a method and apparatus for providing an anti-aliasing diffractive aperture to reduce aliasing effects in an optical system. The present invention uses diffraction at the aperture stop to introduce spreading of a point image. The aperture stop includes an array of apertures whose total area provides the light-gathering capacity required of the optical system. By selecting the size and shape of the apertures, the basic intensity distribution in the image Point Spread Function ("PSF") can be controlled. In addition, by selecting the number of apertures and the orientation of the array, the non-symmetric PSF and the distribution of energy within the PSF can be controlled. It is important to note that the resolution and orientation of a detector array are the primary factors in determining the amount of intensity distribution needed to reduce aliasing effects. In one embodiment, it is desirable to spread a point image over more than one pixel in a detector array in order to reduce aliasing effects.

In the following description, for purposes of explanation, numerous details are set forth in order to provide a thorough understanding of the present invention. However, it will be apparent to one skilled in the art that these specific details are not required in order to practice the present invention.

Figure 1:
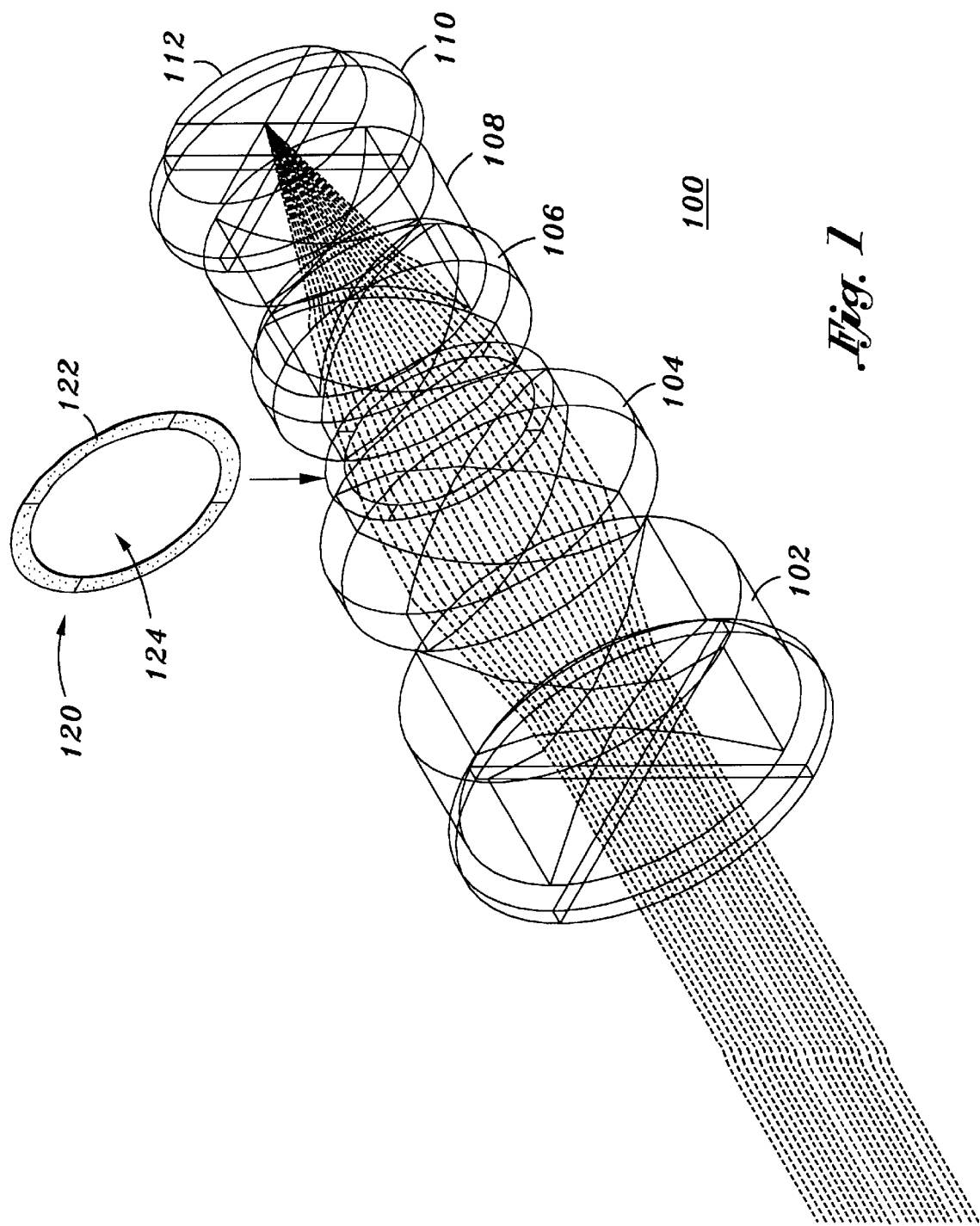
FIG. 1 illustrates an exemplary embodiment of an optical system.

FIG. 1 illustrates an exemplary embodiment of the optical system 100. Referring to FIG. 1, the exemplary optical system 100 includes lens elements 102, 104, 106, and 108, a window 110, a detector array 112 (e.g., a charge coupled device "CCD", CMOS, etc. detector array), and an aperture stop 120. The aperture stop 120 has an outer ring surface 122 which is opaque to light and an aperture 124 which allows light to pass therethrough. As light passes through the aperture 124, the light close to the outer ring surface 122 becomes perturbed. When light converges on the detector array 112, instead of being a perfect point, the light is slightly blurred because of the perturbation. This effect is diffraction of the wavefront.

When the relative aperture of an optical system is "fast" (e.g., an f/2.0 relative aperture), diffraction spreading of the image of a point object is negligible because the perturbation is a small percentage of the total area of the aperture 124 and the light passing therethrough. When the relative aperture is "moderate" (e.g., an f/8.0 relative aperture), diffraction spreading of the image of a point object is small, but measurable as compared to an aperture stop having an f/2.0 relative aperture. When the relative aperture is "slow" (e.g., an f/16.0 relative aperture), diffraction spreading of the image of a point object is readily observed and is larger than the pixel dimensions of a detector array in typical digital imaging systems.

Figure 2:
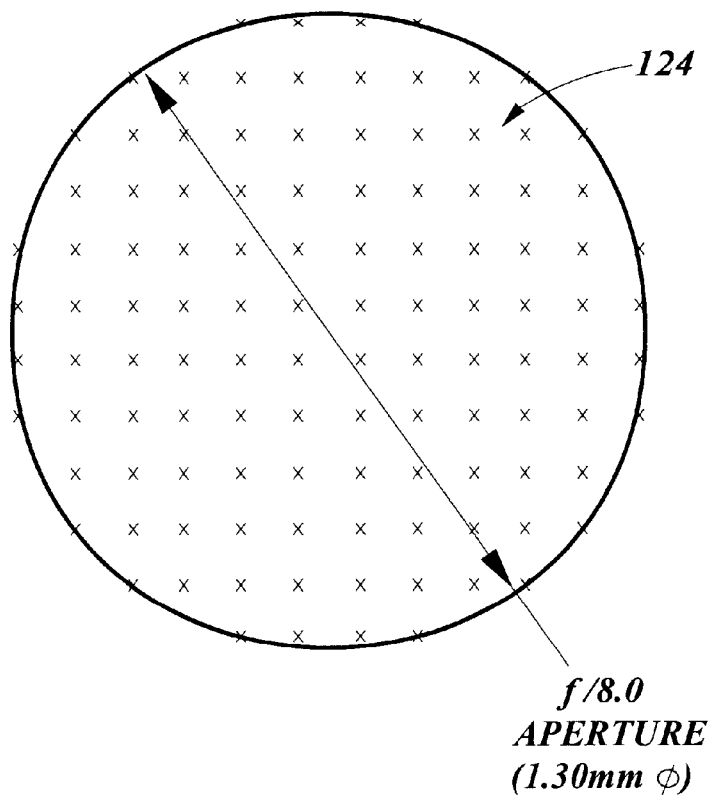
FIG. 2 illustrates an embodiment of the aperture stop of FIG. 1 having a relative aperture of f/8.0.
Figure 4:
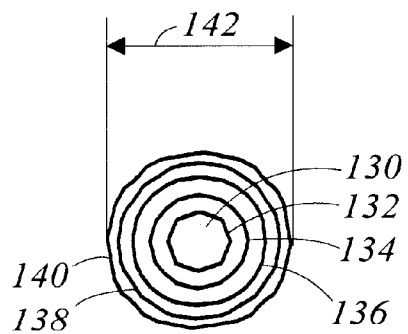
FIG. 4 illustrates a contour plot of the f/8.0 PSF of FIG. 3.

FIG. 2 illustrates an embodiment of the aperture 124 of FIG. 1 having a relative aperture of f/8.0. In one embodiment, the aperture 124 is 1.3 mm in diameter, although other dimensions may be used in lieu thereof. FIG. 3 illustrates the intensity distribution (point spread function "PSF") of a point image for the f/8.0 relative aperture of FIG. 2. Referring to FIG. 3, the intensity distribution includes a fairly sharp peak 130 and a ring 140 having a 0.05 peak illuminance. FIG. 4 illustrates a contour plot of the f/8.0 PSF of FIG. 3. Referring to FIG. 4, the contour plot includes a number of contour rings including ring 132 having a 0.75 peak illuminance, ring 134 having a 0.5 peak illuminance, ring 136 having a 0.25 peak illuminance, ring 138 having a 0.125 peak illuminance, and ring 140 having a 0.05 peak illuminance. The diameter 142 of the PSF is 0.008 mm which falls within the 0.010 mm pixel dimension of a typical detector array. In this embodiment, diffraction does not produce much image spreading for the f/8.0 relative aperture. Therefore, aliasing is not reduced.

Figure 5:
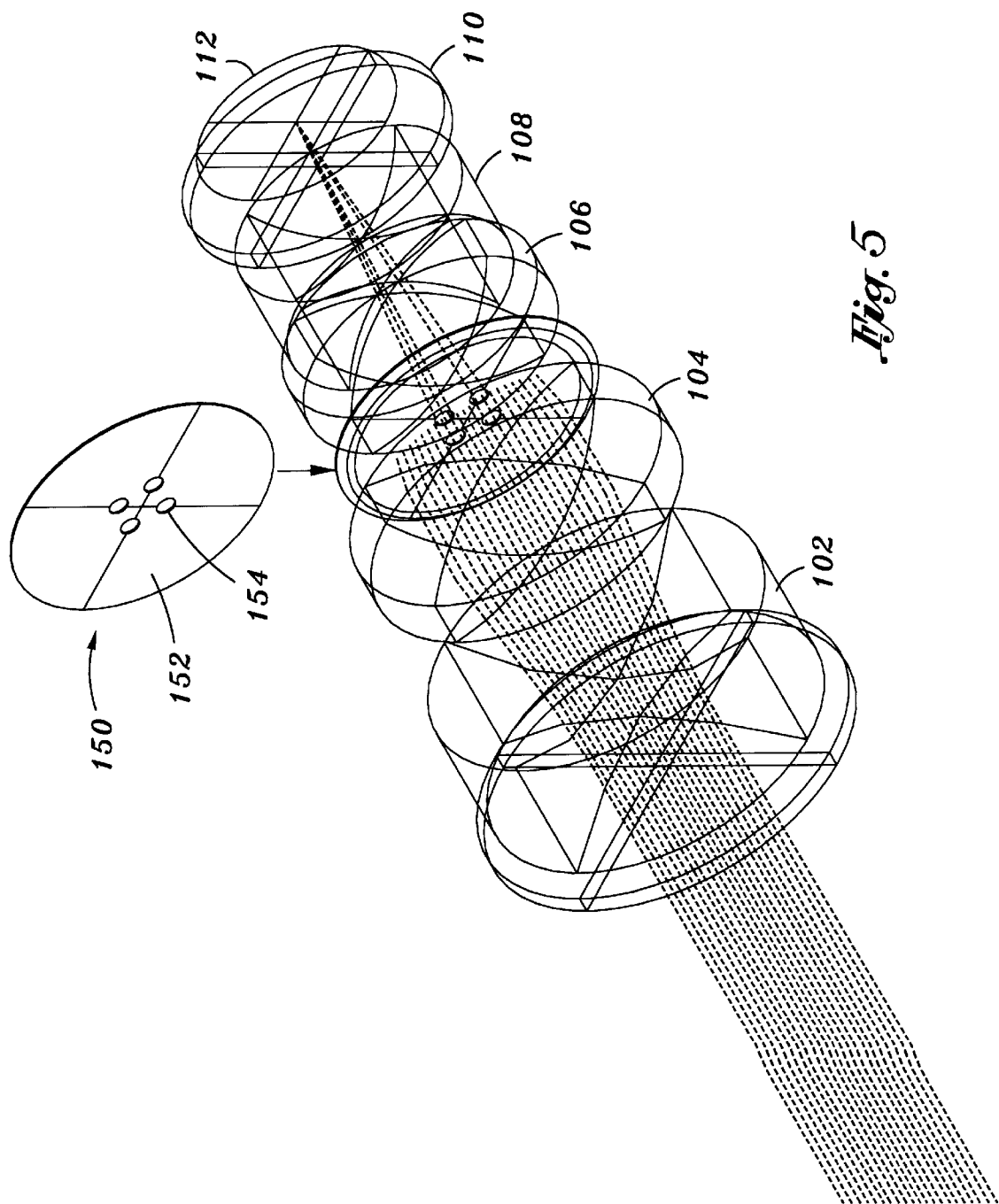
FIG. 5 illustrates the exemplary optical system of FIG. 1 using one embodiment of an aperture stop of the present invention.

FIG. 5 illustrates the exemplary optical system 100 of FIG. 1 using one embodiment of an aperture stop of the present invention. Referring to FIG. 5, the optical system includes an aperture stop 150 having a surface 152 which is opaque to light and four apertures 154 (not to scale). Although the aperture stop 150 includes four apertures, the present invention may utilize any number of apertures greater than one in order to spread a point image over one or more pixels. In one embodiment, the multiple aperture, aperture stop 150 of the present invention spreads out a point image to cover several pixels on the detector array 112.

Figure 6:
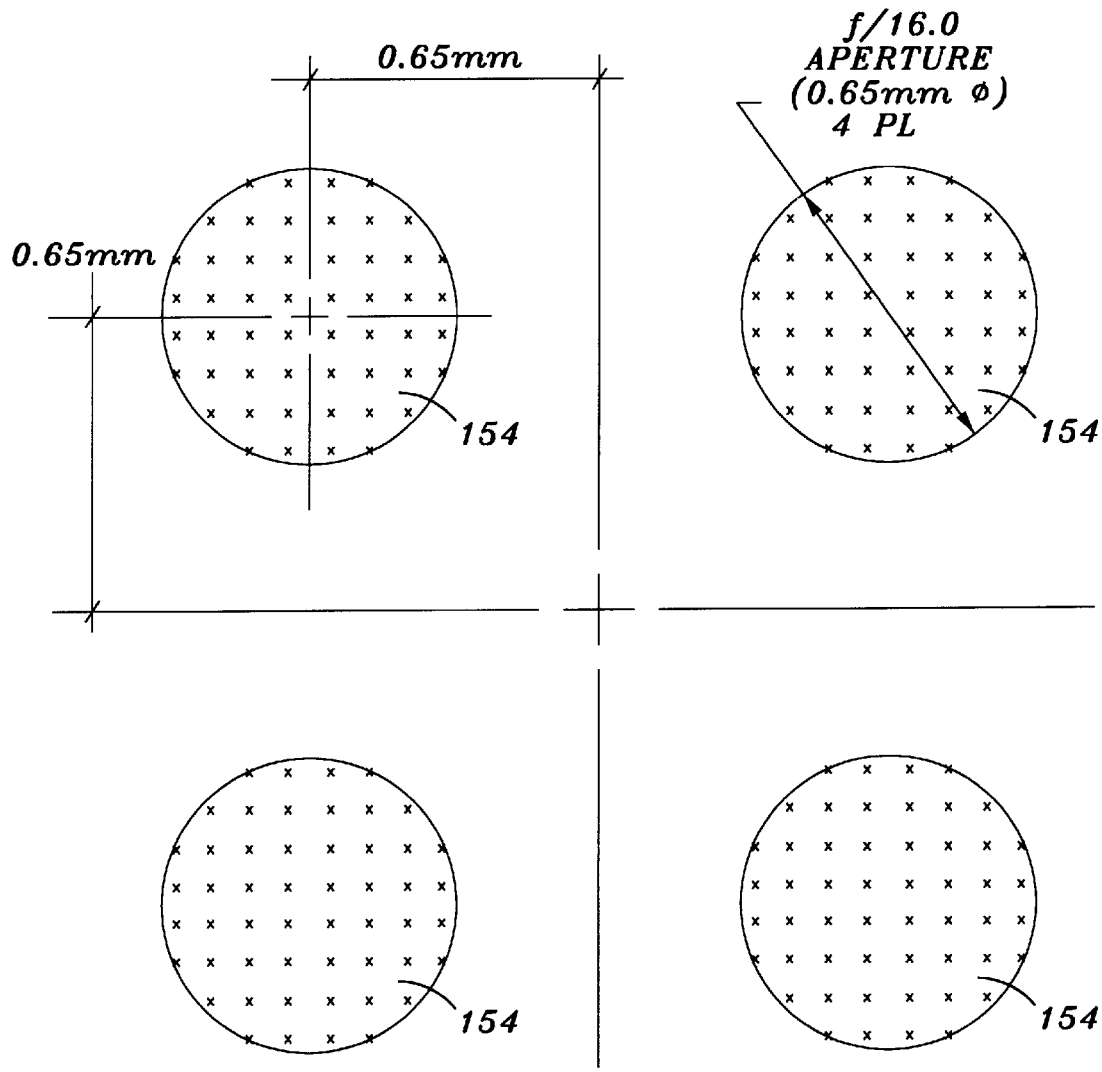
FIG. 6 illustrates an expanded view of the aperture stop of FIG. 5.

FIG. 6 illustrates an expanded view of the aperture stop 150 of FIG. 5. Each aperture 154 has a f/16.0 relative aperture. The four f/16.0 apertures provide as much light as one f/8 aperture, which is sufficient for detector arrays in bright object field illuminance conditions. In this embodiment, each aperture 154 is circular which causes the spreading of a point image to be rotationally symmetric (e.g., Airy pattern). Moreover, in one embodiment, each aperture is 0.65 mm in diameter and the center of each aperture 154 is 0.65 mm in the X-direction and 0.65 mm in the Y-direction from the center of the aperture stop 150. The total area of the apertures 154 is the same as the area of the single aperture 124 of FIG. 2. However, since each f/16 aperture 154 is smaller than the f/8 aperture 124 of FIG. 2, each aperture 154 diffracts more light passing therethrough. In addition, with four apertures 154, the light passing through each aperture 154 will interfere with itself at the detector surface.

It is important to note that the diffraction is wavelength (color) dependent. The size of the diffraction pattern varies with wavelength. The red image is about 85% of the green image and the blue image is about 22% larger than the green image. This behavior may be combined with the color aberrations of the optical system to achieve a more wavelength-independent behavior, but this is a second-order effect on the appearance of the reconstructed image viewed on a monitor.

Figure 7:
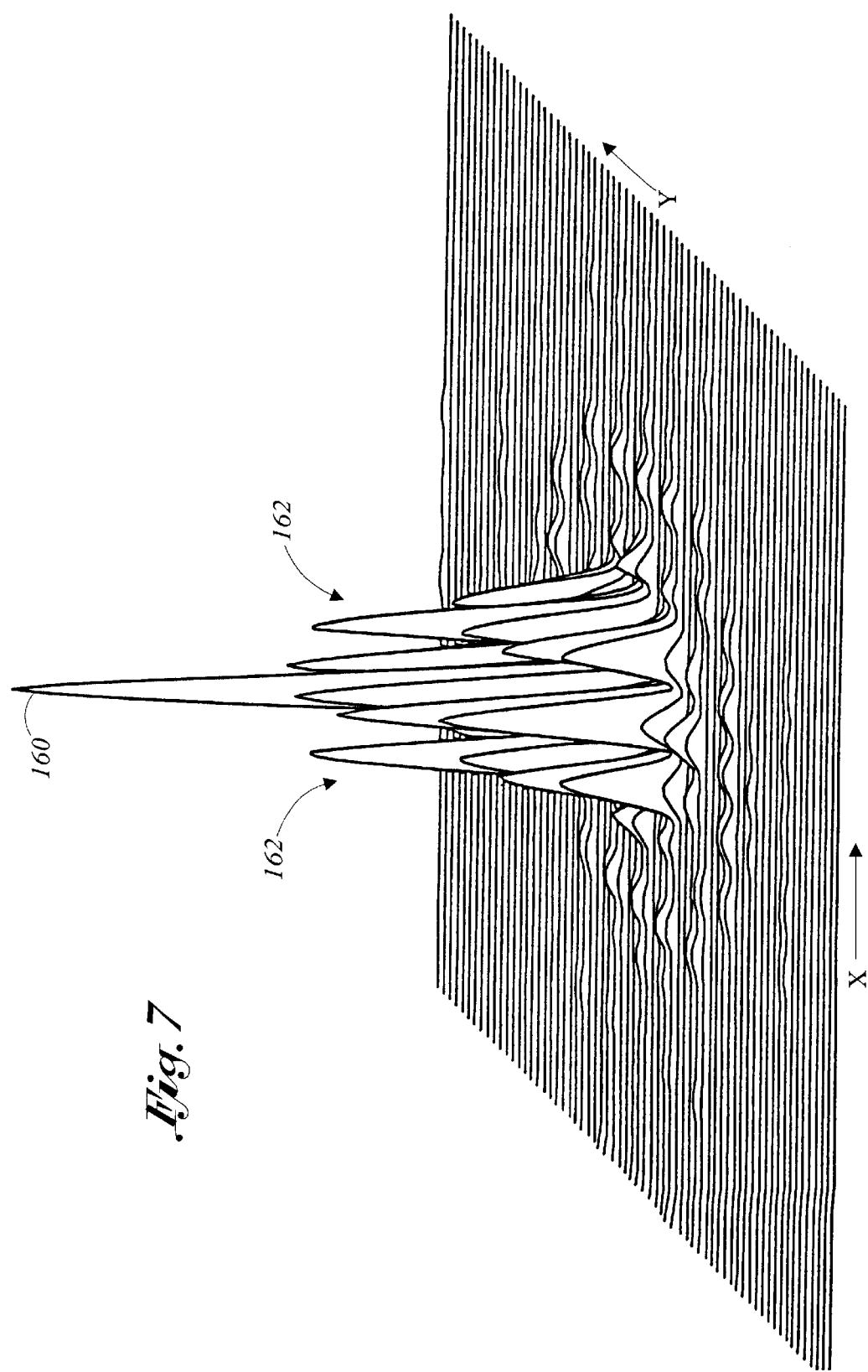
FIG. 7 illustrates the PSF plot for the green channel of the four aperture, aperture stop of FIG. 5.

FIG. 7 illustrates the PSF plot for the green channel of the four aperture, aperture stop 150 of FIG. 5. For a point object, the diffracted light passing through each aperture 154 interferes with its neighboring apertures to provide the PSF shown in FIG. 7. That is, the PSF plot is the result of the summation of the light passing through the four apertures 154. Referring to FIG. 7, the PSF includes a sharp peak 160 at the center, which is smaller than the sharp peak 130 of FIG. 3, and a plurality of smaller peaks 162 around the center peak 160.

Figure 8:
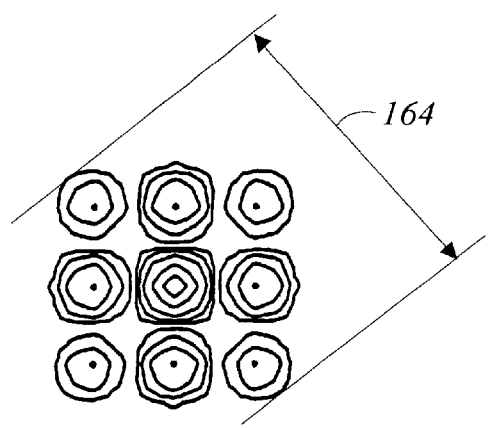
FIG. 8 illustrates the PSF contour plot of FIG. 7 for the green channel.

FIG. 8 illustrates the PSF contour plot of FIG. 7 for the green channel. The maximum dimension 164 of this PSF is 0.015 mm which is almost twice as big as the 0.008 diameter of the single aperture f/8 of FIG. 4. If the energy is not distributed with radial symmetry with respect to a detector array, the aperture stop 150 of FIG. 5 may be rotated (by any number of degrees) to maximize the energy falling on, for example, a number of adjacent pixels (e.g., four) on the detector array. Thus, with one embodiment of the present invention, a point image is spread to cover more than one pixel which reduces aliasing effects.

Figure 9:
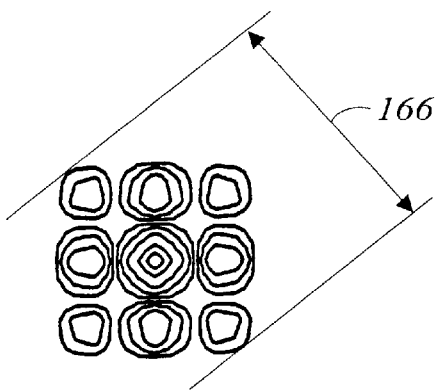
FIG. 9 illustrates the PSF contour plot of FIG. 7 for the red channel.
Figure 10:
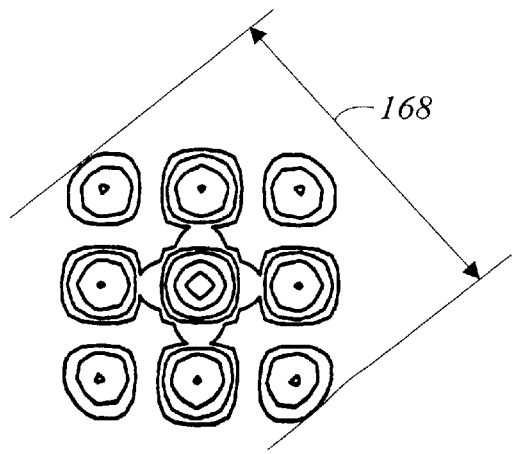
FIG. 10 illustrates the PSF contour plot of FIG. 7 for the blue channel.

FIG. 9 illustrates the PSF contour plot of FIG. 7 for the red channel which is 85% of the green channel dimensions. The maximum dimension 166 of this PSF is 0.01275 mm. FIG. 10 illustrates the PSF contour plot of FIG. 7 for the blue channel which is 22% larger than the green channel dimensions. The maximum dimension 168 of this PSF is 0.0183 mm. By controlling the size and shape of one or more apertures in the array, color distribution of the spot size can also be modified, to compensate for some color aberrations in the lens.

It is to be noted that the geometry of the array of apertures affects the spreading of energy in the PSF. In the embodiment shown in FIG. 6, the array consists of four circular apertures 154 on a square grid. For this geometry the PSF consists of about nine closely-spaced spots (see, e.g., FIG. 8). In the embodiment of FIG. 6, the separation between the apertures 154 controls the distance between the nine spots of FIG. 8, while the diameter of the apertures 154 controls the irradiance distribution across the nine spots.

It is to be appreciated by one skilled in the art that the present invention includes other embodiments and that the embodiment shown is merely exemplary. For example, in another embodiment, the present invention may include an aperture stop having three f/12.0 circular apertures placed in a triangular orientation. In this embodiment, the three f/12.0 apertures provide as much light as one f/8 aperture. In a further embodiment, the aperture stop may include five f/20 apertures placed in a pentagon orientation to provide spreading of a point image. In yet a further embodiment, the aperture stop may include different size apertures.

The present invention further contemplates that the shape of the apertures may be changed. For example, if the aperture stop includes four rectangular apertures (instead of circular), the spreading of the PSF consists of four orthogonal spikes. If the aperture shape is triangular, the spreading consists of six spikes. If the aperture shape is annular, the spreading is radial and rotationally symmetric. That is, the use of an annular aperture or a series of annular apertures nested inside one another may be used to produce radial spreading of the image which has rotational symmetry. In a further embodiment, each aperture may have a different shape such as, but not limited or restricted to, a square, rectangle, triangle, or any other shape which causes an asymmetric spot pattern on the detector array.

The theorem which describes the energy distribution of light from multiple apertures is called "The Array Theorem." This theorem states that the diffraction pattern of an array of apertures consists of two separable features. If the array pattern is reduced to point apertures, the image will consist of the Fourier Transform of this array (e.g., a rectangular grid of apertures will produce a different sized rectangular grid of point images). The non-point geometry of each real aperture will then produce a diffraction pattern irradiance distribution across the points in the image grid.

Figure 11:
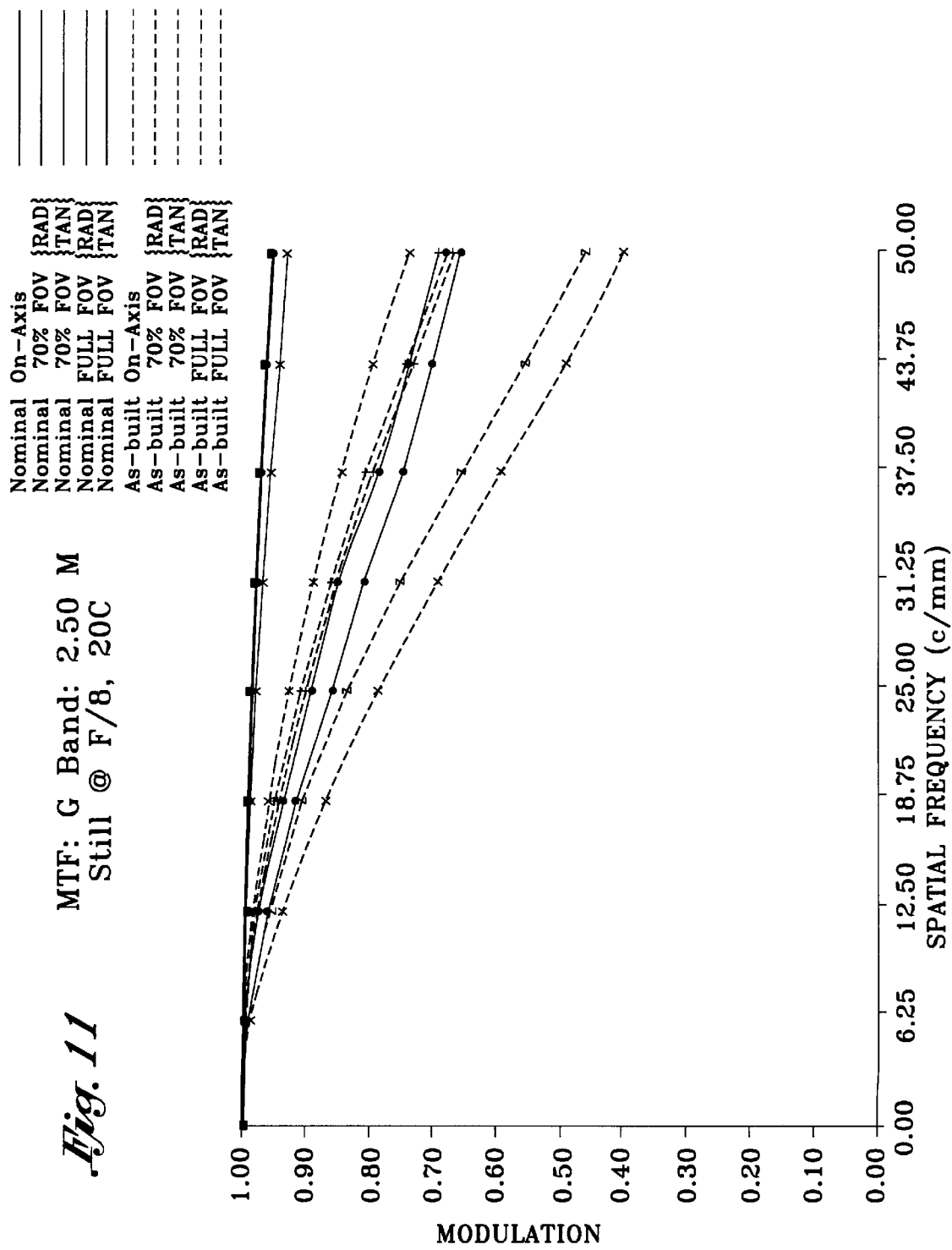
FIG. 11 illustrates the modulation transfer function performance of the optical system of FIG. 1 using a single f/8.0 aperture geometry.

FIG. 11 illustrates the modulation transfer function ("MTF") performance of the optical system of FIG. 1 using a single f/8.0 aperture geometry. The MTF represents the resolution as a function of the spatial frequency in the image plane. As can be seen, the MTF curves are relatively high. For example, at 50 lines per millimeter, the modulation exceeds 50% for the worst case in the field of view.

Figure 12:
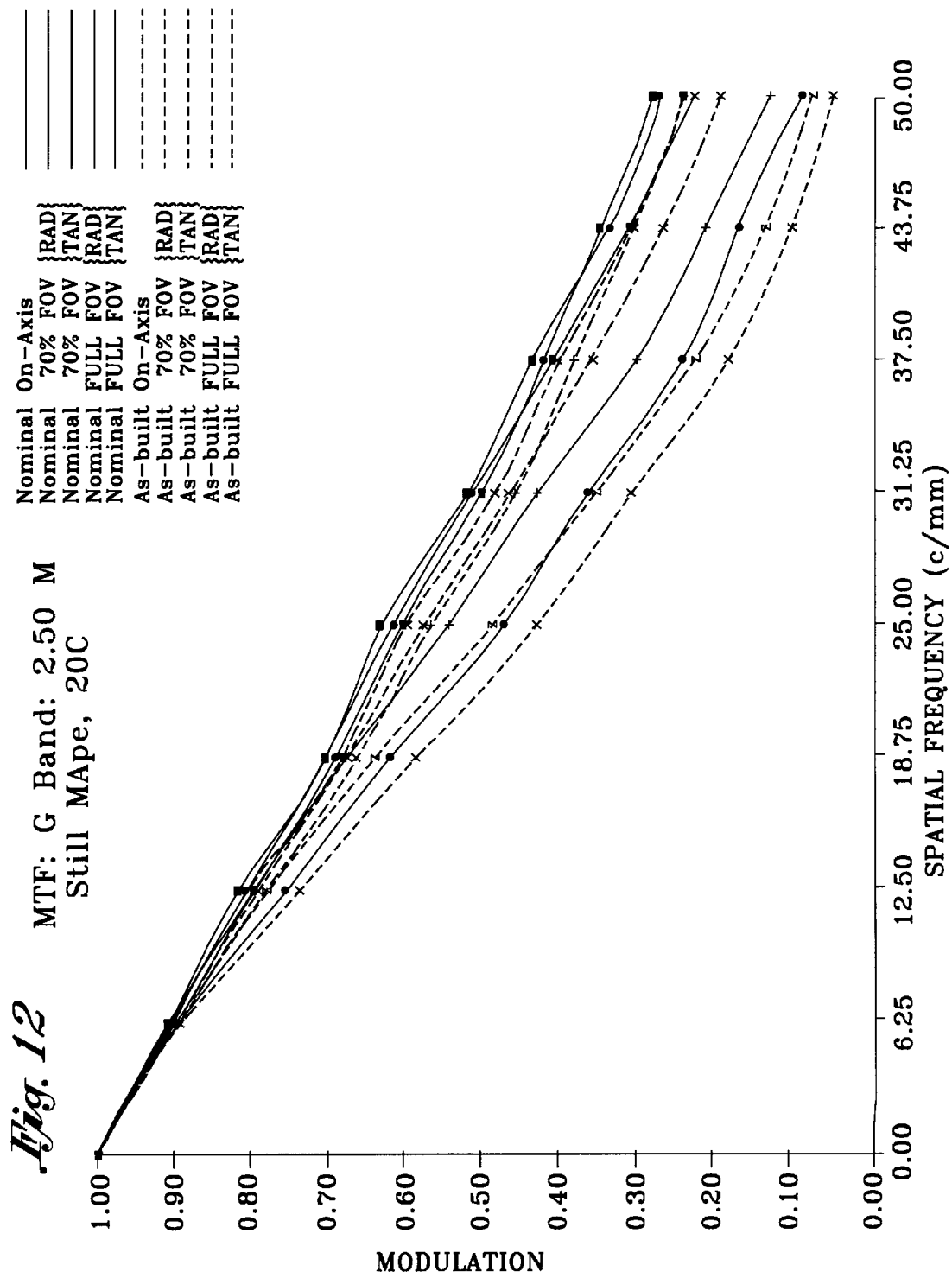
FIG. 12 illustrates the MTF performance of the optical system of FIG. 1 using the four f/16.0 aperture geometry of FIG. 6.

FIG. 12 illustrates the MTF performance of the optical system of FIG. 1 using the four f/16.0 aperture geometry of FIG. 6. The MTF at 50 lines per/mm for the four f/16.0 aperture geometry is about half the MTF for the single aperture geometry and all object field points have nearly the same MTF performance. That is, the MTF at higher frequencies drops down and this behavior reduces aliasing effects. The multi-aperture geometry of the present invention can be modified to achieve greater PSF spreading and lower MTF if required. The ideal case is for the MTF to be zero at 50 lines per/mm.

It is to be appreciated that the four lens-element optical system shown in FIGS. 1 and 5 is merely exemplary (e.g., for illustration purposes only) and that the anti-aliasing aperture stop of the present invention (with its numerous variations described herein) may be implemented in other types of optical systems having, for example, any number of lens elements, any type of detector array, etc.

A further feature of the present invention is that the aperture stop of the present invention may be manually placed in the optical system of FIG. 1 by the user. This concept is similar to an iris diaphragm changing the f/-stop of an optical system. A manufacturer in the factory (or the user in the field) can select the aperture geometry that gives the best trade between anti-aliasing and image resolution by simply placing a different aperture stop in the optical path.

The advantage of the present invention is that aliasing can be reduced by controlling the size, shape, and orientation of an array of apertures. This is an inexpensive solution because it requires a simple modification of an already existing aperture stop. Prior art anti-aliasing mechanisms such as quartz plates are expensive and take up extra space in the optical system.

The control of the size, shape, and energy distribution within the PSF is a novel feature that is easily achieved by this multiple-aperture diffraction concept but can only be achieved with difficulty by other means in the prior art. The method of this invention provides image structure advantages to the control of the shape and energy distribution features which are not provided by most prior art methods (but are provided by expensive stacks of birefringent quartz plates).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An anti-aliasing apparatus comprising: an aperture stop including an array of apertures, each aperture to diffract light passing therethrough and provide spreading of an image of a point object in a controlled irradiance distribution to cover more than one pixel on a detector array.

2. The anti-aliasing apparatus of claim 1 wherein the size of the image of the point object is a function of a size of each aperture.

3. The anti-aliasing apparatus of claim 1 wherein the shape of the image of the point object is a function of a shape of each aperture.

4. The anti-aliasing apparatus of claim 1 wherein the irradiance distribution within the image of the point object is a function of an orientation of said array of apertures.

5. The anti-aliasing apparatus of claim 1 wherein said array of apertures diffract light passing therethrough and provide spreading of the light in a controlled irradiance distribution to cover more than a pixel on a detector array.

6. The anti-aliasing apparatus of claim 1 wherein each aperture is circular.

7. The anti-aliasing apparatus of claim 1 wherein said array of apertures is oriented in a rectangular configuration.

8. The anti-aliasing apparatus of claim 1 wherein said array of apertures is oriented in a triangular configuration.

9. The anti-aliasing apparatus of claim 1 wherein said array of apertures includes at least two annular zones nested inside one another.

10. An optical system comprising:
a detector array having an array of pixels;
an aperture stop positioned between an object plane and said detector array, said aperture stop including an array of apertures, each aperture to diffract light passing therethrough and provide a controlled spreading of an image of a point object to cover more than one pixel on said detector array; and
a lens element positioned between said object plane and said detector array.

11. The optical system of claim 10 wherein said lens element is positioned between said aperture stop and said detector array.

12. The optical system of claim 10 wherein the size of the image of the point object is a function of a size of each aperture.

13. The optical system of claim 10 wherein the shape of the image of the point object is a function of a shape of each aperture.

14. The optical system of claim 10 wherein the spreading of light within the image of the point object is a function of an orientation of said array of apertures.

15. The optical system of claim 10 wherein said array of apertures on said aperture stop diffract light passing therethrough and provide spreading of the light in a controlled irradiance distribution to cover more than one pixel on said detector array.

16. The optical system of claim 10 wherein each aperture is circular.

17. The optical system of claim 10 wherein said array of apertures is oriented in a rectangular configuration.

18. The optical system of claim 10 wherein said array of apertures is oriented in a triangular configuration.

19. The optical system of claim 10 wherein said array of apertures includes at least two annular zones nested inside one another.

20. The optical system of claim 10 wherein said aperture stop includes an array of apertures which are shaped to cause an asymmetric spreading of the image of the point object.

21. The optical system of claim 20 wherein said aperture stop includes an array of apertures, each aperture having a shape selected from a group comprising of a circle, square, rectangle, and triangle.

22. The optical system of claim 10 wherein said aperture stop is removably coupled between said object plane and said detector array.

23. The optical system of claim 10 wherein said aperture stop is rotated with respect to said detector array to vary the spreading of the image of the point object.

24. An image forming optical system comprising:

a detector array having an array of pixels;

an anti-aliasing aperture stop positioned in front of the detector array, said aperture stop including an array of apertures, each aperture to diffract light passing therethrough and provide a controlled point spread function wherein an image of a point object is spread to cover more than one pixel on said detector array; and a lens element positioned between the anti-aliasing aperture stop and the detector array.

* * * * *